(12) United States Patent
Kosmider et al.

(10) Patent No.: US 6,488,746 B1
(45) Date of Patent: Dec. 3, 2002

(54) AIR FILTER ASSEMBLY HAVING NON-CYLINDRICAL FILTER ELEMENTS, FOR FILTERING AIR WITH PARTICULATE MATTER

(75) Inventors: Kristofer G. Kosmider, Bloomington, MN (US); Steven A. Johnson, St. Paul, MN (US); Thomas D. Raether, St. Louis Park, MN (US)

(73) Assignee: Merchant & Gould, Minneapolis, MN (US)

( * ) Notice: Subject to any disclaimer, the term of this patent is extended or adjusted under 35 U.S.C. 154(b) by 0 days.

(21) Appl. No.: 10/145,288

(22) Filed: May 13, 2002

Related U.S. Application Data

(63) Continuation of application No. 09/608,774, filed on Jun. 30, 2000, now Pat. No. 6,387,162.

(51) Int. Cl.[7] .................................................. B01D 46/00
(52) U.S. Cl. ............................ 95/273; 55/484; 55/498; 55/502; 55/529
(58) Field of Search ........................ 55/498, 502, 378, 55/379, 381, 341.1, 484, 529, 361; 95/273

(56) References Cited

U.S. PATENT DOCUMENTS

| | | |
|---|---|---|
| 2,072,906 A | 3/1937 | Rosenberger |
| 2,952,332 A | 9/1960 | Metro |
| 3,131,044 A | 4/1964 | Springer |
| 3,327,458 A | 6/1967 | Auckland |
| 3,421,295 A | 1/1969 | Swift et al. |
| 3,475,884 A | 11/1969 | Kulzer |
| 3,524,304 A | 8/1970 | Wittemeier et al. |
| 3,830,042 A | 8/1974 | MacDonnell |
| 3,891,418 A | 6/1975 | Burger et al. |
| 4,072,484 A | 2/1978 | Carre |
| 4,187,091 A | 2/1980 | Durre et al. |
| 4,343,632 A | 8/1982 | Margraf |
| 4,345,924 A | 8/1982 | Margraf |
| 4,395,269 A | 7/1983 | Schuler |
| 4,415,343 A | 11/1983 | Margraf |
| 4,496,377 A | 1/1985 | Margraf |
| 4,504,293 A | 3/1985 | Gillingham et al. |
| D283,621 S | 4/1986 | Gauer et al. |
| 4,661,131 A | 4/1987 | Howeth |
| 4,746,339 A | 5/1988 | Millard |
| 4,968,424 A | 11/1990 | Plaisier |
| 5,062,867 A | 11/1991 | Klimczak |
| 5,074,896 A | 12/1991 | Baert et al. |
| 5,173,098 A | 12/1992 | Pipkorn |
| 5,238,474 A | 8/1993 | Kahlbaugh et al. |
| 5,562,746 A | 10/1996 | Raether |
| 5,730,766 A | 3/1998 | Clements |
| D417,268 S | 11/1999 | Gillingham |
| 6,387,162 B1 * | 5/2002 | Kosmider et al. |

FOREIGN PATENT DOCUMENTS

| | | |
|---|---|---|
| DE | 26 25 578 A1 | 12/1977 |
| DE | 27 44 037 A1 | 4/1979 |
| GB | 2 195 558 A | 4/1988 |

* cited by examiner

*Primary Examiner*—Duane S. Smith
(74) *Attorney, Agent, or Firm*—Merchant & Gould, P.C.

(57) ABSTRACT

An air filter assembly for removing particulate matter from an incoming dirty air stream. The assembly includes a housing having an inlet, an outlet, a dirty air chamber and a clean air chamber and a non-cylindrical shaped elongated filter element arranged within the dirty air chamber constructed to remove particulate matter from an incoming air stream. A plurality of non-cylindrical filter elements are preferred. The non-cylindrical filter elements provide a decreased incoming air stream velocity when compared to conventional cylindrical filter elements having the same surface area. Alternately, the non-cylindrical filter elements allow an increase in the volume of incoming air when compared to conventional cylindrical filter elements having the same surface area.

21 Claims, 7 Drawing Sheets

AIR FILTER ASSEMBLY HAVING NON-CYLINDRICAL FILTER ELEMENTS, FOR FILTERING AIR WITH PARTICULATE MATTER

This application is a continuation of application Ser. No. 09/608,774, filed Jun. 30, 2000, U.S. Pat. No. 6,387,162. Application Ser. No. 09/608,774 is incorporated by reference herein.

FIELD OF THE DISCLOSURE

The present disclosure is related to air filtering systems having non-cylindrical filter elements, and methods of using systems equipped with non-cylindrical filter elements.

BACKGROUND OF THE DISCLOSURE

Many industries often encounter particulate matter suspended in the atmosphere. In some industries, this particulate matter is a valuable product, for example, starch; it would be beneficial if these suspended particulate could be recovered and reintroduced into the process. For other industries, such as metal or wood working, the particulate matter may be simply dust; it is desirable to remove dust particles from the air in order to provide a clear working environment.

Systems for cleaning an air or other gas stream laden with particulate matter include air filter assemblies that have filter elements disposed in a housing. The filter element may be a bag or sock of a suitable fabric or pleated paper. The gas stream, contaminated with particulate, typically is passed through the housing so that the particulate are captured and retained by the filter element. Cleaning is accomplished by periodically pulsing a brief jet of pressurized air into the interior of the filter element to reverse the air flow through the filter element, causing the collected contaminants to be collected . Such air filter assemblies are disclosed in, for example, U.S. Pat. No. 4,218,227 (Frey) and U.S. Pat. No. 4,395,269 (Schuler), which patents are hereby incorporated by reference.

Cylindrical filter elements are usually used in an air filter assembly to process dust particles from an airstream. In a standard design of air filter assembly, an air filter assembly has a clean air chamber and a dirty air chamber. The two chambers are separated by a sheet metal, commonly referred to as a tube sheet. The tube sheet has a number of openings from which cylindrical filters are aligned. The filters suspend downwardly with or without an angle from the tube sheet openings into the dirty air chamber. Particulate-laden air is introduced into the dirty air chamber, and the particulates collect onto the filter. The filtered air passes through the filters to the interior of the filters, and upwardly out through the openings in the tube sheet into the clean air chamber. From the clean air chamber, the cleaned air is exhausted into the environment, or recirculated for other uses. For example, U.S. Pat. Nos. 4,424,070 (Robinson), U.S Pat. No. 4,436,536 (Robinson), U.S Pat. No. 4,443,237 (Ulvestad), U.S Pat. No. 4,445,915 (Robinson), U.S Pat. No. 5,207,812 (Tronto et al.), U.S Pat. No. 4,954,255 (Muller et al.), U.S Pat. No. 5,222,488 (Forsgren), and U.S Pat. No. 5,211,846 (Kott et al.) are prior art examples of prior art cylindrical filter elements of the pleated cartridge type.

Non-cylindrical filter elements are sometimes used to process dust, particles from an airstream and provide increased filtration area within a housing than cylindrical filter elements. For example, U.S. Pat. No. 5,730,766 (Clements) discloses a non-round unitary filter cartridge having a unitary structure with pleated filter media formed securely about a perforated interior core in a dust collector. U.S. Pat. No. 4,661,131 (Howeth) discloses non-cylindrical filters having a greater clean air flow area than a plurality of cylindrical elements fitted within the same dimensional envelope.

In one conventional design of air filter assembly with non-cylindrical filter elements, non-cylindrical filter elements simply replaces cylindrical filter elements. With less space between adjacent filter elements, more non-cylindrical filter elements are placed within a housing than cylindrical filter elements. U.S. Pat. No. 5,730,766 (Clements) discloses this type of use of non-cylindrical filter elements.

In another conventional design of air filter assembly with non-cylindrical filter elements, a plurality of cylindrical elements are replaced by a single non-cylindrical filter element. U.S. Pat. No. 4,661,131 (Howeth) discloses this type of use of non-cylindrical filter elements.

Unfortunately, each of these conventional designs which utilize non-cylindrical filter elements has its disadvantages and drawbacks.

SUMMARY OF THE DISCLOSURE

The construction and arrangement of the disclosed air filter assembly helps to overcome the problems of the prior art. In particular, in one embodiment, the structure and arrangement of the assembly of the present disclosure enables the processing of 25% more dust laden airflow compared to conventional systems. In preferred systems, the assembly of the present disclosure results in a dust laden airflow increase greater than 25% without an increase in the geometric size of the filter housing apparatus or the number of filter cartridges required. The present design provides this 25% volume increase, preferably greater than 25% increase, by maintaining the amount of filtration media available for filtering the dirty air rather than increasing the amount of filtration media. In another embodiment, the assembly of the present disclosure results in an airflow increase greater than 25% by decreasing the amount of filtration media available. Also, the structure and arrangement of the air filter assembly provides more efficient filter retention/sealing, filter housing apparatus manufacturing, and filter handling.

In one aspect, the disclosure describes an air filter assembly adapted for removing particulate matter from a high volume air stream. The air filter assembly of the present disclosure, utilizing non-cylindrical filter elements, is capable of handling 25% more air than a conventional air filter assembly utilizing cylindrical filter elements having the same amount, or less, surface area available for filtration. In particular, an air filter assembly of the present disclosure comprises a housing including an air inlet, an air outlet, and a spacer wall separating the housing into a filtering chamber and a clean air chamber, the spacer wall including a first air flow aperture therein. The air inlet provides a dirty air volume to the air filter assembly, where the dirty air volume has an air flow direction. The air filter assembly further includes a first filter construction positioned in air flow communication with the first air flow aperture in the spacer wall; the first filter construction including an extension of filter media disposed between proximal end cap and distal end cap. The filter media, proximal and distal end caps defines a filter construction inner clean air chamber. The first filter construction: is oriented within the filter inner clean air chamber in air flow communication with the spacer wall first air flow aperture; has a cross-sectional area, when taken parallel to the first air flow aperture, the cross-sectional area having a long axis perpendicular to a short axis; and has a width along the long axis and a width along the short axis, the long axis width being greater than the short axis width and the long axis positioned parallel to the air flow direction.

In another aspect or embodiment, an air filter assembly is provided that comprises a housing including an air inlet, an air outlet, a spacer wall separating said housing into a filtering chamber and a clean air chamber and including a first air flow aperture therein. The air inlet provides a dirty air volume to the air filter assembly, the dirty air volume having an air flow direction and an air speed. The air filter assembly further includes a first filter construction: positioned in air flow communication with the first air flow aperture in the spacer wall; including an extension of filter media defining a filter construction inner clean air chamber; having a cross-sectional area, when taken parallel to the first air flow aperture, the cross-sectional area having a long axis perpendicular to a short axis; having a width along the long axis and a width along the short axis, the long axis width being greater than the short axis width and the long axis positioned parallel to the air flow direction; and further having a first surface area defined by the extension of filter media. The volume of dirty air processable by this air filter assembly is at least 10 percent greater, preferably 20 percent greater, and most preferably at least 25 percent greater than a volume of dirty air processable by an air filter assembly differing from the claimed assembly only by the shape of the filter elements.

In another embodiment, the structure and arrangement of the assembly of the present disclosure results in an air speed that is at least 10 percent, preferably 20 percent, and most preferably at least 25 percent less than the air speed of a similar volume of air being filtered by an air filter assembly differing from the claims assembly only by the shape of the filter elements.

Such an air filter assembly provides for longer filter life and increases the capacity for particulate removal from the incoming dirty air stream, thus decreasing the need to change used filter elements.

In another aspect, such an air filter assembly provides greater capacity, both for the airflow capacity and the amount of particulate removed from the dirty air stream, without decreasing filter life. This decreases the total amount of filters needed at each replacement cycle and over the life of the operation.

A method of filtering or cleaning dirty air to provide clean air is also disclosed.

BRIEF DESCRIPTION OF THE DRAWINGS

FIG. 3 is a front elevation view of the air filtration system depicted in FIG. 2;

FIG. 4 is a perspective view of a portion of a mounting arrangement utilized in the air filtration system of FIGS. 1–3;

DETAILED DESCRIPTION OF THE PREFERRED EMBODIMENT

Figure 1:
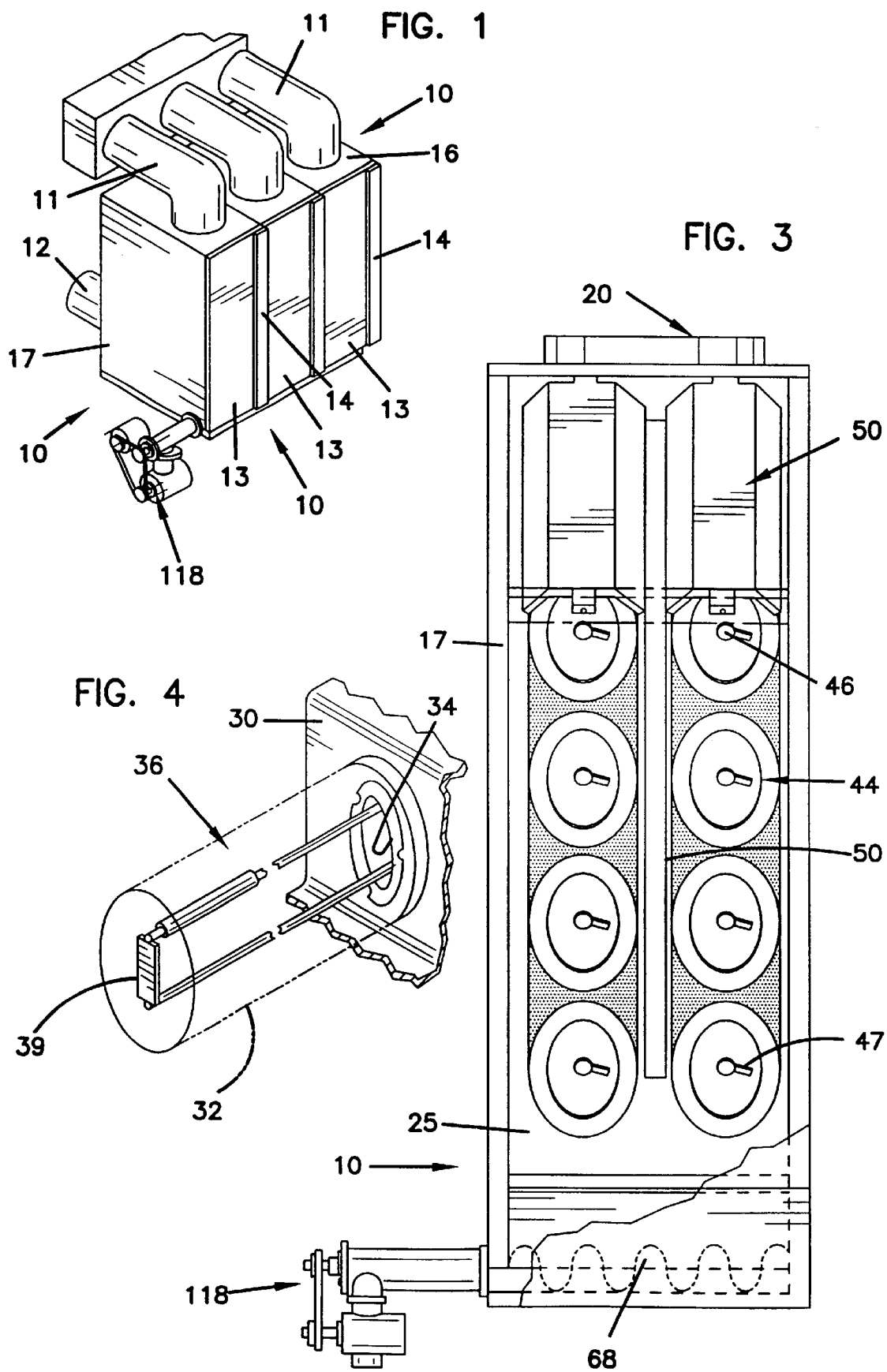
FIG. 1 is a perspective view of one type of operational installation of an air filtration system having non-cylindrical filter elements according to the present disclosure.

Referring to FIG. 1, an air filtration system or assembly is depicted generally at 10. The system 10 depicted is shown with three units or modules configured together in side-by-side arrangement. This arrangement can be, for example, of a size that fits into a 2 meter by 3 meter by 3 meter space (approximately 6 feet by 10 feet by 10 feet).

Each module in FIG. 1 is generally in the shape of a box and includes an upper wall panel 16, and two pairs of opposite side wall panels 17. A front access door 13 and a secondary access door 14 permit access to the interior of each module for purposes of, for example, maintenance. Each module further includes a conduit 11 for receiving dirty or contaminated air (i.e., air with particulate matter therein) into the filter assembly. A like conduit 12 is provided for venting clean or filtered air from the filter assembly 10.

Also shown in FIG. 1 is a motor and chain drive assembly 118 of standard construction for operation of an auger screw in the base portion of the assembly. The auger is used to remove collected particulate from the interior of the air filtration assembly, as will be discussed in detail later.

Figure 2:
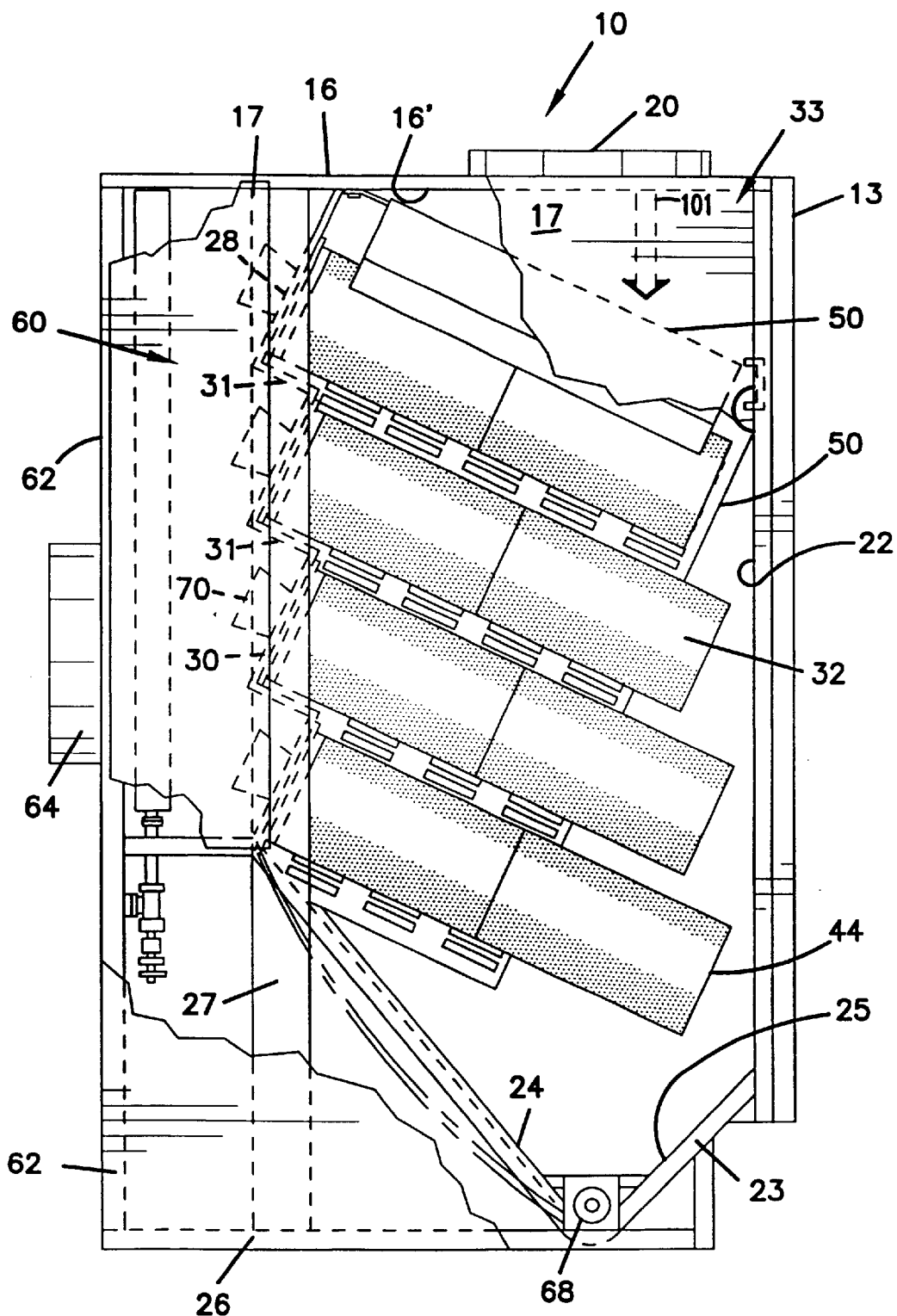
FIG. 2 is a side elevational view, partially broken away, of one embodiment of the air filtration system of FIG. 1 utilizing non-cylindrical elements according to the present disclosure.

Referring now to FIG. 2, the present disclosure is shown in side elevation with one side wall panel 17 being broken away to facilitate description of the a arrangement of the various elements of the assembly. In this embodiment, the upper wall panel 16 has an inner wall surface 16' with an air inlet 20 positioned in the upper wall panel 16 so that entering dust-laden air or other contaminated gas is introduced in a downwardly direction (referred to as air flow direction 101) into a dirty air chamber 22. A typical volume of incoming dirty air is about 500 cubic feet per minute (cfm) for one conventional cylindrical filter element; in accordance with the present disclosure, a typical volume of incoming dirty air may be at least about 550 cfm, preferably at least about 600 cfm, and more preferably at least about 625 cfm. In many industries where air filter assemblies of this type are installed, the amount of dust or other particulate contaminant in the dirty air stream is about one grain (0.0648 gram) of particulate per each cubic foot of air. Filtered or "clean air" typically has less than 0.001 grain particulate per each cubic foot of air. The top inlet 20 allows the assembly to utilize the forces of gravity in moving the dust particulate down through the assembly 10 to the collection area.

The dirty air chamber 22 is defined by the door 13, the upper wall panel 16, the two pairs of opposing side wall panels 17 which extend downwardly from the upper panel 16, stepped wall structure 28 (shown in phantom in FIG. 2), and a pair of sloping wall surfaces 23, 24. Sloping wall surfaces 23, 24 partially define a collection area or hopper 25 within the base portion of the assembly. The dirty air chamber 22 is a sealed chamber in order to prevent any escape of contaminated air or fluid prior to its being filtered.

A bottom base panel or frame 26 is sealed to the side wall panels 17 in any suitable, standard manner. The volume of dirty air chamber 22 is generally less than about 176 cubic feet, and is typically about 73 to 176 cubic feet. One common volume about 97.3 cubic feet.

Side panel 17 may be any structure suitable for enclosing and encasing dirty air chamber 22. Side panels 17 are typically planar sheets, made of, for example, metal or plastic. In one embodiment, shown in FIG. 5A, side panels 17 may include stiffeners 29, such as rails, bars, and the like, which strengthen the side panels 17 and improve the panels' resistance to the large volumes of air flowing through the dirty air chamber 22. Typically, these stiffeners are placed internally and extend vertically from upper wall panel 16 to bottom panel 26 (not shown in FIG. 5A), although horizontal stiffeners may be used in some embodiments. Vertical stiffeners 29 are typically preferred because they produce minimal interference, although some interference, with the downward airflow pattern. A single stiffener 29 or multiple stiffeners 29: may be present on any one or a plurality of side panels 17. Still referring to FIG. 5A, in a preferred embodiment the distance "a" between filter element 32 and side panel 17 is at least about 5 cm, less than about 30 cm, typically about 5 to 20 cm, and in one example about 10.4 cm (4.1 inches). The distance "b" between stiffener 29 and filter element 32 is at least about 2 cm, less than about 25 cm, typically about 2 cm to 15 cm, and in one example is about 5.3 cm (2.1 inches).

Figure 5A:
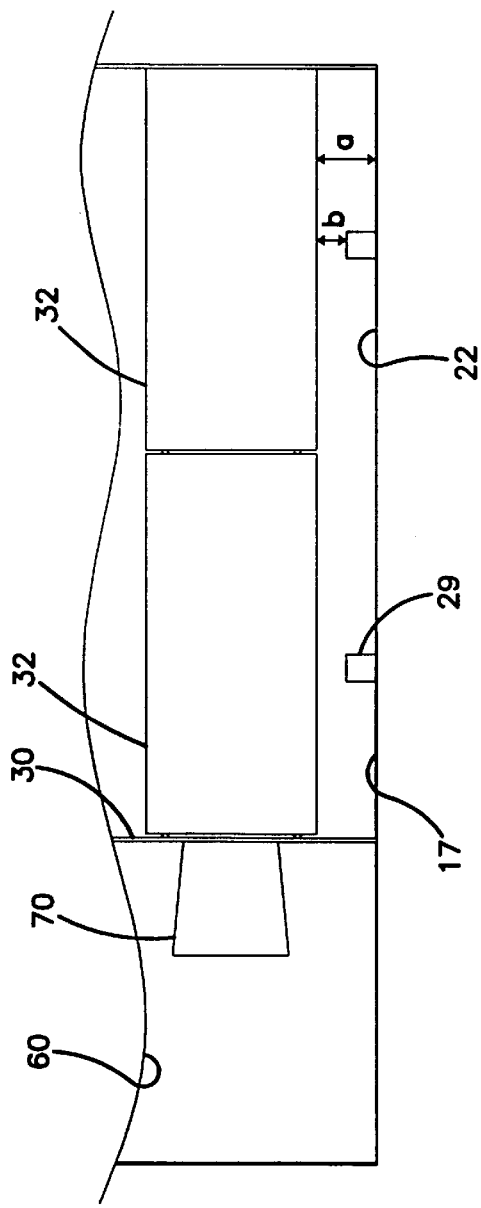
FIG. 5A is a top view of a portion of an air filtration system showing one embodiment of a side panel for use in the air filtration system of the present disclosure.
Figure 5B:
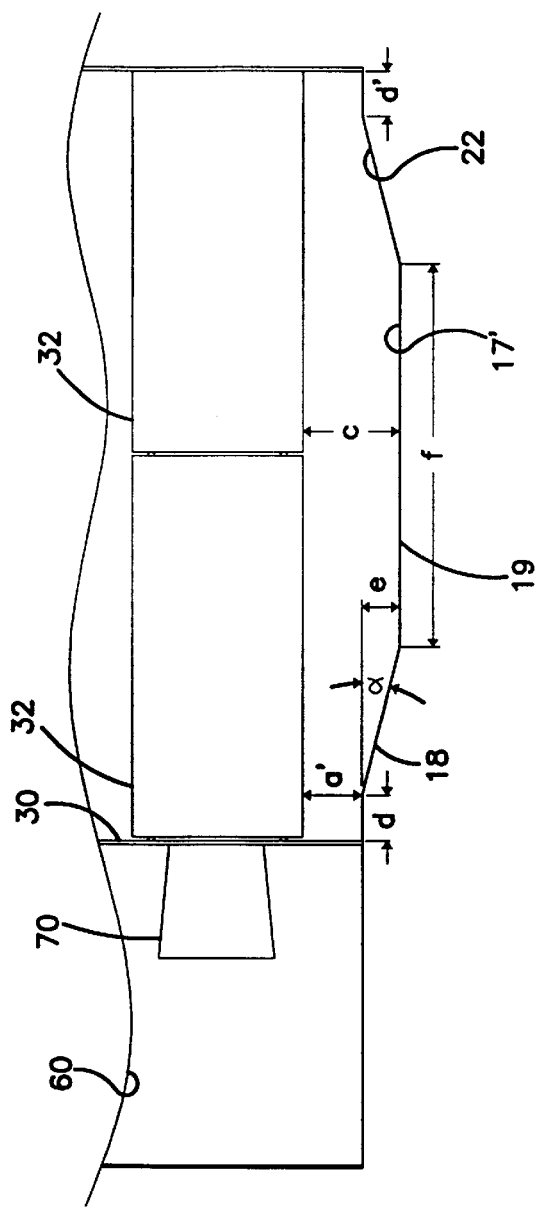
FIG. 5B is a top view of a portion of an air filtration system showing a second embodiment of a side panel for use in the air filtration system of the present disclosure.

In another embodiment, shown in FIG. 5B, stiffeners 29 have been removed and replaced with expanded or distended side panel 17'. Side panel 17' is distended from filter elements 32 and includes sloped panel 18 and distended panel 19. Distended panel 19 is displaced a distance "e" out from where a planar side panel 17 (as shown in FIG. 5A) would be, thus providing a maximum distance between filter element 32 and side panel 17' of "c". Sloped panel 18 is placed at an angle "α" from where a planar side panel 17 would be. As seen in FIG. 5B, a portion of side panel 17' may remain parallel to filter element 32 and non-distended. Overall, distended side panel 17' increases the area through which the dirty air can flow down, compared to a planar side panel, thereby lowering the velocity of the air traveling past the filter elements 32 and providing for increased volumes of air. Stiffeners 29 as shown in FIG. 5A, or other such features, are not needed to strengthen side panel 17' because the shape produced by the angled panels provides the requisite stiffness.

In one embodiment, the distance "a" between filter element 32 and the end of side panel 17' is at least about 5 cm, less than about 30 cm, typically about 5 to 20 cm, and in one example, about 10 cm, similar to that distance in the embodiment shown in FIG. 5A. The distance "c", between filter element 32 and distended wall panel 19, is at least about 10 cm, less than about 50 cm, typically about 10 to 25 cm, and in one example about 17 cm. The distance "e", that is, the distance of distention from where a planar panel would be, is at least about 2 cm, less than about 20 cm, typically about 2 to 15 cm, and in one example about 6 cm. The distance "d" (and "d'") may be less than about 20 cm, typically less than about 10 cm, and in one example, about 8 cm. In some embodiments "d" may be 0 cm (zero).

In one particular preferred embodiment, "a''" is 10.4 cm (4.1 inches), "c" is 16.7 cm (6.6 inches), both "d" and "d'" are 8.6 cm (3.4 inches), "e" is 6.4 cm (2.5 inches), "f", the length of distended panel 19, is 66.0 cm (26.0 inches), and angle "α" is 14.2 degrees. These dimensions are preferred for a filter element 32 having a width (when measured perpendicular to its length) of about 38 cm (about 15 inches) and a length of 132.1 cm (52.0 inches). In another particular preferred embodiment, "a'''" is 11.0 cm (4.3 inches), "c" is 17.3 cm (6.8 inches), both "d" and "d'" are 8.6 cm (3.4 inches), and "e, "f", and angle "α" are the same as in the first embodiment. These dimensions are preferred for a filter element 32 having a width (when measured perpendicular to its length) of about 29 cm (about 11 inches) and a length of 132.1 cm (52.0 inches). The filter element 32 may comprise two stacked filter elements 32 each having a length of about 66 cm (26 inches).

Sealed to a structural frame member 27 along each of the side wall panels 17, 17' is mounted a spacer wall or tube sheet structure 28 to which are mounted the separate filter elements 32 of the assembly. The tube sheet structure 28 is sealed on all four of its sides to hermetically seal the dirty air chamber 22 from a clean air chamber 60. The volume of clean air chamber 60 is generally less than about 35 cubic feet, and is typically about 19 to 35 cubic feet. One common volume about 34.9 cubic feet. Together with the dirty air chamber 32, this would provide a total chamber volume of about 92 cubic feet to 211 cubic feet.

In the embodiment shown, spacer wall or tube sheet structure 28 has a step-like design, although it is understood that planar tube sheet structures, or structures having other geometries, can be used. The structure 28 in the shown embodiment has three steps or indented portions. Each step portion includes an upwardly extending back member 30 and a leg member 31 extending at right angles from the back member 30. The tube sheet structure 28 is preferably constructed from a single piece of sheet steel and thus, the individual step portions are continuous extensions of the step portion immediately above it and below it.

As shown in FIGS. 2 and 3, the filter elements 32 mounted to structure 28 are positioned in the dirty air chamber 22 in stepped, partially overlapping relationship. The filter elements 32 may be positioned in a generally downward direction at an acute angle of inclination with respect to the horizontal plane of the upper surface panel 16. In this manner, a distribution space 33 is defined in the uppermost portion of the filter assembly 10 by an inclined baffle 50, the side wall panels 17, 17', the upper wall panel inner surface 16', and front access door 13. The inclined baffle 50 is positioned to dissipate the incoming air flow throughout the dirty air chamber 22. As the dirty air enters the assembly 10 from the inlet 20, it is received into the distribution space 33 prior to its being filtered.

The individual filter elements 32 preferably are formed of pleated media, such as paper, formed into non-cylindrical tube elements each having opposite ends. Each of these ends typically has an end cap thereon. Details of the construction of the filter element 32 and how the filter media is fashioned into a stable non-cylindrical shape and confined with end caps is disclosed in U.S. Pat. No. 4,171,963 (Schuler), which is incorporated herein by reference.

An example of how a filter element 32 may be supported to the structure 28 is disclosed in U.S. Pat. Nos. 4,395,269 and 5,562,746. In particular, the support assembly for supporting the filter element is shown in FIG. 4. Back member portion 30 of the structure 28 has an opening (not shown) through which is disposed a Venturi element 70 (shown in phantom in FIG. 2). Venturi element 70 is positioned on the tube sheet structure 28 in relation to the filter element 32 such that the Venturi 70 is disposed in the clean air chamber 60. A yoke assembly 36, constructed to extended through the Venturi element 70 and into the center of filter element 32, is used for supporting the filter element 32. The yoke assembly 36 includes steel rods attached to (for example, by welding) and extending from the structure 28. Yoke assembly 36 is positioned to extend from structure 28 into the dirty air chamber 22. Alternatively, although not shown in the figures, steel rods of the yoke assembly can be threaded at the proximal end and extend through notches in the Venturi bell-mouthed-portion and apertures in the flange of the Venturi element 70. In such a case, a rod can be structured so that it can be secured to the tube sheet structure 28 together with the flange of the Venturi element 70 by a nut placed on the clean air chamber side of the tube sheet structure. This can be achieved in a variety of ways. For example, the rod can have an integral ridge proximate its proximal end to act a stop as the proximal end of the rod is extended through an aperture of the tube sheet structure 28 to be fastened with a nut. This arrangement has the advantage that no rod extends through the throat of the Venturi element 70. Another practicable alternative for securing the filter element to the tube sheet structure 28 is one similar to the arrangement disclosed in U.S. Pat. No. 4,218,227 (Frey).

Figure 6:
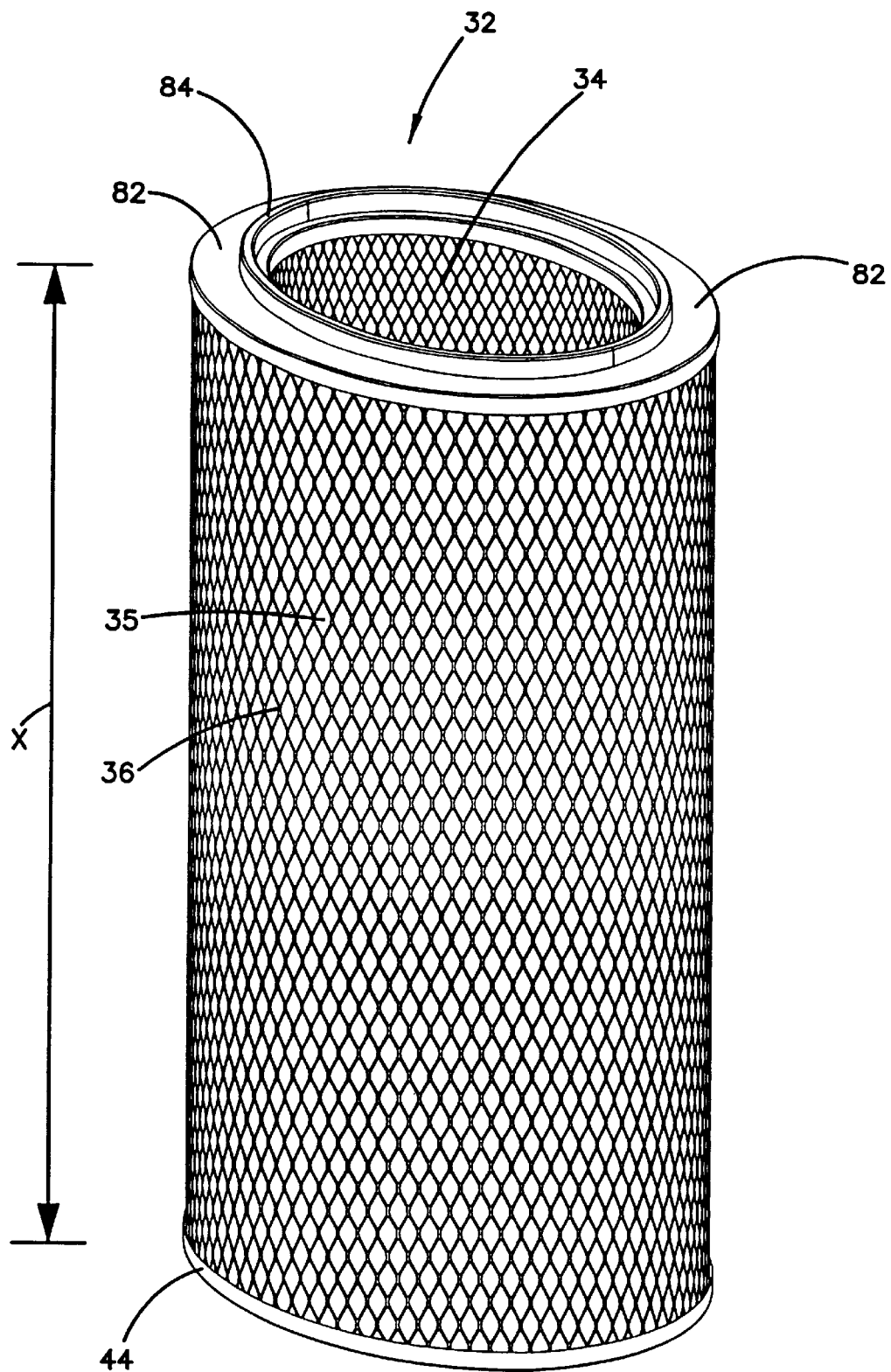
FIG. 6 is a side perspective view of an embodiment of a non-cylindrical element utilized in the air filtration system of the present disclosure.

Referring now to FIG. 6, non-cylindrical filter element 32 typically comprises a pleated filtration media 35 extending essentially the length of filter element 32. An outer liner 36 protects the filtration media 35 from physical damages. Likewise, an inner liner 34 is positioned inside the filtration media 35 to protect and support filtration media 35.

Each of the ends of the filtration media 35 is preferably potted or confined in an end cap (or collar member). A first end cap 82, referred to herein as the "proximal end", is an annular end cap and allows access to the interior of filter element 32. The opposite "distal end cap" 44 is a continuous cap that seals access to the interior of filtration media 35. The filtration media 35 and end caps 82, 44 define a filtered or clean air chamber (not shown). In some embodiments, such as when two filter elements 32 are stacked axially, distal end cap 44 of the first element 32 may be an annular cap, in order to allow air to flow freely between the internal chambers of the two stacked elements.

Generally, the portion of the media 35 covered by the end caps is not considered porous to air as it is shielded by the end cap. When mounted on the structure 28 via yoke 36, proximal end cap 82 is positioned against the structure 28. In some embodiments, a gasket may be disposed between the proximal end cap 82 and the structure 28. By pressing the filter element 32 toward the structure 28 and compressing the gasket, an axially directed seal is provided between proximal end cap 82 and structure 28 to prevent air leakage.

In the embodiment shown in FIG. 4, each yoke assembly 36 is secured essentially perpendicular to the structure 28 so as to suspend the filter elements 32 at an acute angle with respect to horizontal. (Back member 30, on which yoke assembly 36 is positioned, is at an angle to horizontal). In some embodiments, however, back member 30 may be vertical, i.e., perpendicular to horizontal, and yoke assembly 36 is structured so that filter elements 32 are nevertheless positioned at an acute angle with respect to horizontal. The preferred range for the angle of inclination of the filter elements 32 is about 15°–30° from the horizontal, although the system can work with any angle of inclination, including no angle. In the embodiment shown in FIGS. 2 and 3, each back member 30 of the stepped structure 28 has two horizontally spaced apart yoke assemblies 36 mounted thereon. Preferably, all of the filter elements 32 on the various steps of stepped structure 28 are parallel to one another. For a planar tube sheet structure 28, the filter elements 32 are also preferably parallel to one another.

FIG. 2 illustrates the placement of a pair of filter elements 32 onto each yoke assembly 36; two filter elements 32 are positioned axially in relation to one another. An annular distal end cap 44 having a centrally located opening is aligned with the end plate 39 so as to sealingly cover the outboard end of the second filter element of each pair. This allows the removable attachment of a clamping arrangement for axially compressing the gaskets 84 (not shown in FIGS. 2–3) of the filter elements 32 to seal them to the tube sheet structure 28 as well as to each other. Also, a fastening bolt 46 with its special handle 47 is inserted through the aligned apertures of the end plate 39 and end cap 44 to secure the two together.

Directly behind the tube sheet structure 28 is the clean air chamber 60 which is defined by the back surface panel 62 of the assembly and a portion of the upper surface panel 16, a portion of the two opposing side panels 17, 17', and the back side of the tube sheet structure 28. Mounted in the back surface panel 62 is a clean air outlet 64 for venting the clean, filtered air into the conduit 12 for return to the plant environment.

Until the present disclosure, cylindrical filter elements have typically been used in air filter assemblies such as described herein. However, it has been found that in conventional systems, operation of these types of dust collectors at an increased air flow volume results in increased air speeds, which in turn results in a reduction of filter life because of the abrasiveness of the particulates in the air. An increased airflow, for example, 8315 cubic feet per minute (cfin) or greater, leads to high cabinet air/dust velocity which can abrade holes in the filter cartridges. The high air velocity may also inhibit the drop-out of the dust particles into the collection hopper. This results in the filters being plugged and a loss in total dust collection airflow. The present disclosure provides an air filter assembly that provides high volumetric airflow with sufficiently low air speeds to minimize filter damage.

The non-cylindrical filter elements, when utilized in the air filter assembly of the present disclosure, have an extended life when compared to conventional cylindrical filter elements. The non-cylindrical filter elements provide decreased air velocities, thus reducing the amount of damage caused to the filter elements. Nevertheless, the non-cylindrical filter elements will eventually need replacement with new, clean filter elements when the filter elements become occluded and plugged. The non-cylindrical filters are removed when the pressure drop across the filtration media is about 4–6 inches of water.

Figure 7:
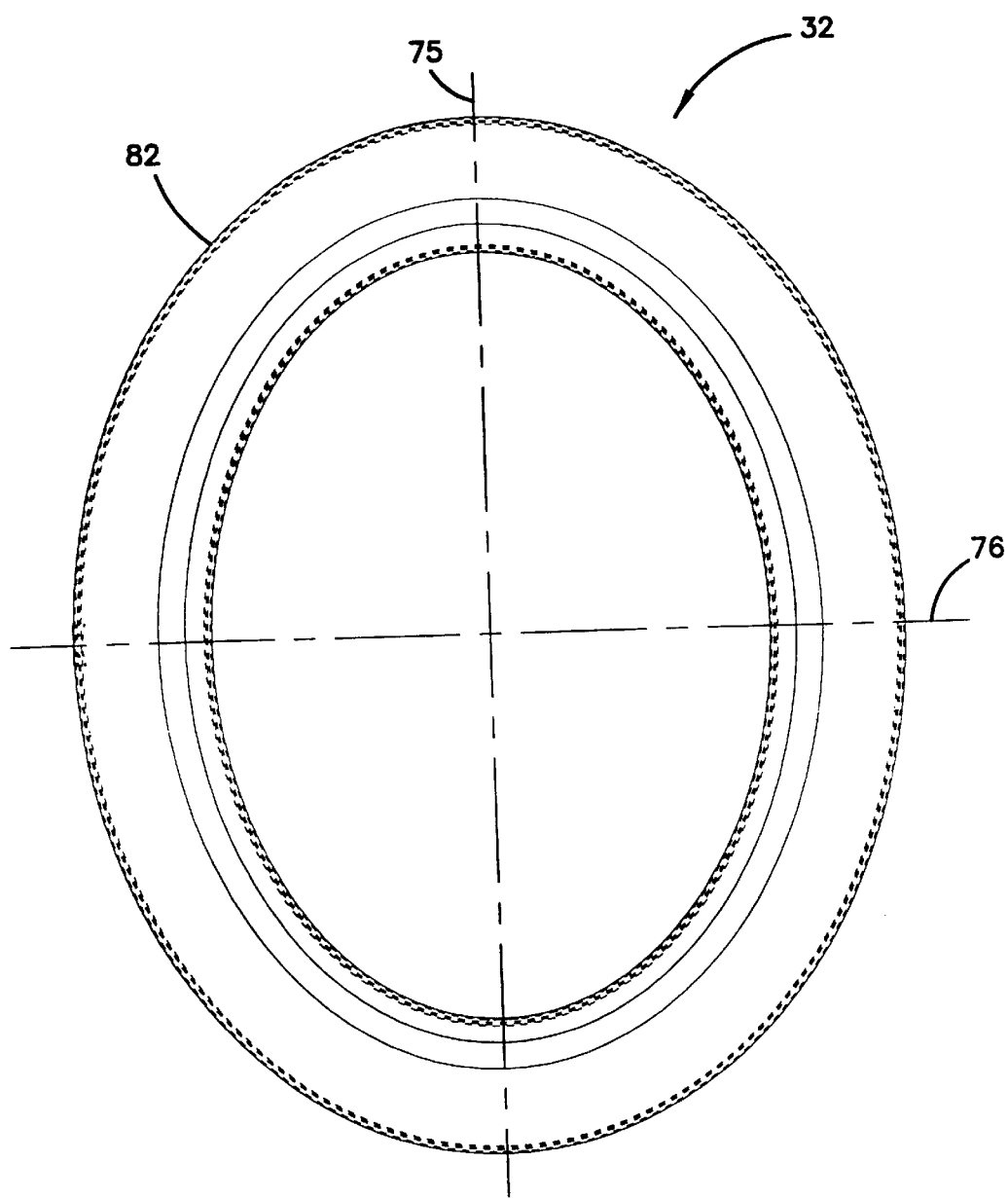
FIG. 7 is an enlarged end view of the non-cylindrical filter element shown in FIG. 6.

Referring now to FIGS. 6–7, a filter element 32 in accordance with the present disclosure will be explained in detail. Filter element 32 has a non-cylindrical sleeve of filtration media 35, preferably pleated, extending from proximal end cap 82 to a distal end cap 44. Typically, proximal end cap 82 is annular, providing for access to the clean air or filtered air chamber. In some embodiments, distal end cap 44 may be annular or may be continuous; in the context of this disclosure, an "annular end cap" is one where the end cap is ring-like and allows access to the interior of filtration media 35 (it is "open"), and a "continuous end cap" is one that extends across the span of filtration media 35 and does not allow access to the interior of filtration media 35; in other words, it is "closed". Generally for two stacked filter elements 32, distal end cap 44 will be annular for the first of the stacked filter elements 32 and distal end 82 will be a continuous cap with a central aperture for passing a bolt therethrough for the second elements. A central aperture (minimal in size) may be included in a continuous end cap to allow passage of a bolt or other fastener therethrough so as to provide attachment of the filter element 32 to stepped tube sheet 28; however, any aperture is tightly sealed by the fastener.

The length of filter element 32, shown as "x" in FIG. 6, generally taken from the outermost end of proximal end cap 82 to the outermost end of distal end cap 44 is at least about 45.7 cm (18 inches), less than about 122 cm (48 inches), typically about 55.9–76.2 cm (22–30 inches), often about 61.0–71.1 cm (24–28 inches), and preferably about 66.0 cm (26 inches), although longer and shorter filter elements could be used. Additionally, multiple filter elements 32, for example, two, three, or more filter elements 32, may be axially stacked to provide more filtration area.

Because filter element 32 is non-cylindrical, filtration media 35 and each end cap 82, 44 are also non-cylindrical; each end cap has a long axis 75 and a short axis 76, when taken perpendicular to the filtration media 35. FIG. 7 illustrates proximal end cap 82 with long axis 75 and short axis 76.

The aspect ratio, that is, the ratio between the short axis 76 of the end cap and the long axis 75 of the end cap, is typically at least about 0.5, less than 1.0, and is preferably about 0.7 to 0.9. In some systems, an aspect ratio of about 0.80 is preferred. It has been found that the lower the aspect ratio, the lower the air velocity as the air flows through the dirty air chamber 22 and around and through the filter elements 32. This results in less damage to the filter elements 32 and longer element life. An aspect ratio of about 0.8 for a non-cylindrical filter element typically provides an increase of airflow by about 10%, generally at least about 20%, and in some instances, by about 25% over that of a conventional cylindrical filter element, while keeping the cabinet air velocities the same. However, as the aspect ratio for non-cylindrical filter elements decreases (i.e., the short axis 76 decreases in relation to the long axis 75), it becomes difficult to pulse clean air backwards through the elements 32 to loosen compacted particulates, due to the narrowness of the element through which the air pulse must travel.

The exterior dimension of end cap 82 (and end cap 44), when taken along the long axis 75, is at least about 15 cm, less than about 60 cm, typically is about 27.9–45.7 cm (11–18 inches), and preferably about 33.0–38.1 cm (13–15 inches). The interior dimension of end cap 82 (and optionally of end cap 44), when taken along the long axis 75, is at least about 5 cm, less than 55 cm, typically about 20.3–38.1 cm (8–15 inches), and preferably about 25.4–30.5 cm (10–12 inches). The exterior dimension of end cap 82 (and end cap 44), when taken along the short axis 76, is at least about 10 cm, less than about 55 cm, typically about 20.3–38.1 cm (8–15 inches), preferably about, 25.4–30.5 cm (10–12 inches). Generally, the interior dimension of the end cap 82 (and optionally of end cap 44), when taken along the short axis 76, is at least about 5 cm, less than about 50 cm, typically about 12.7–30.5 cm (5–12 inches), and preferably about 17.8–22.9 cm (7–9 inches). The dimensions of the proximal end cap 82 and the distal end cap 44 will usually be the same; that is, typically the filter element 32 will not be tapered, but for some embodiments a taper may in fact be desired.

In a preferred embodiment, the exterior dimensions of either end cap 82, 44 are 37.70 cm (14.844 inches) along the long axis 75, and 30.08 cm (11.844 inches) along the short axis 76. If the end cap is annular, the interior dimensions of either end cap 82, 44 are 27.88 cm (10.976 inches) along the long axis 75, and 20.26 cm (7.976 inches) along the short axis 76. The length of the filter element 32 is preferably about 66.0 cm (26 inches). Thus, if two elements 32 were stacked, the overall length of the filter elements 32 would be 132.1 cm (52 inches). In another preferred embodiment, the exterior dimensions of either end cap 82, 44 are 36.47 cm (14.360 inches) along the long axis 75, and 28.85 cm (11.36 inches) along the short axis 76.

Figure 8:
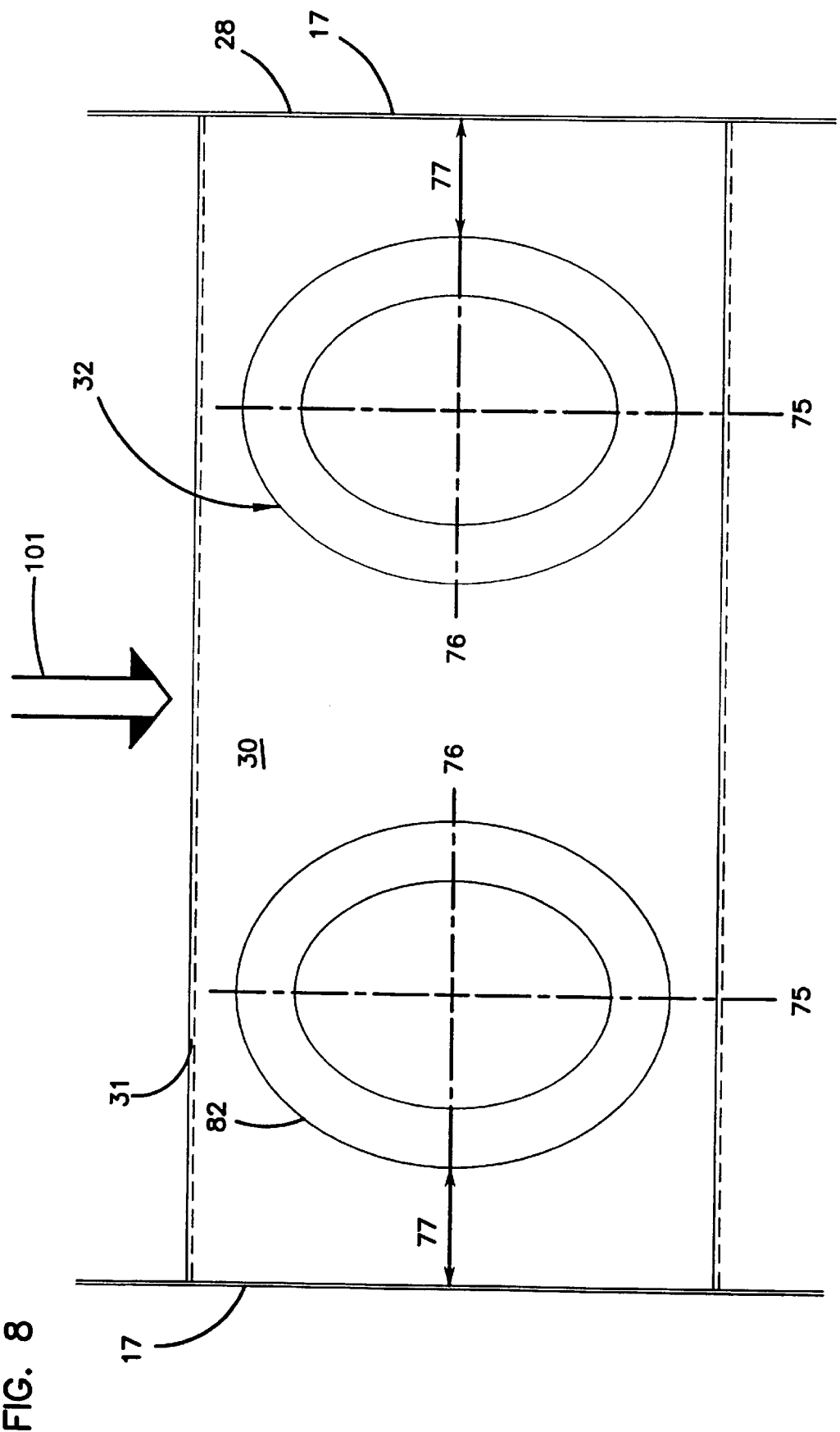
FIG. 8 is an end view of a row of non-cylindrical filter elements mounted in an air filtration system according to the present disclosure.

Each filter element 32 is mounted onto tube sheet structure 28, in particular onto back member 30 of tube sheet structure 28, by yoke assembly 36. Referring to FIG. 8, which shows two filter elements 32 mounted onto back member 30, it can be seen that filter element 32 is mounted so that the long axis 75 of the two elements 32 are vertical and parallel to one another; the long axis 75 of the elements 32 are vertical in relation to the entire air filtering assembly 10, and in particular, to the incoming air flow direction 101. A cross-sectional area of filter element 32 taken parallel to tube sheet structure 28 along the length of filter element 32 would also provide long axis 75 and short axis 76. Air inlet 20 (shown in FIGS. 2 and 3) provides air to filter elements 32 by the air flow direction shown in FIG. 8 as 101. Long axis 75 is parallel to air flow direction 101. Preferably, short axis 76 of the two filter elements 32 are co-planar, but in some embodiments it may be desired to offset the two short axis 76, for example by vertical displacement of the entire filter element 32.

In accordance with the present disclosure, non-cylindrical filter elements 32, when positioned with the short axis perpendicular to the downward flow of air through the dirty air chamber 22, decrease the downward velocity of the dirty dust laden air stream as it proceeds through the dirty air chamber 22 of the air filter assembly 10. Each non-cylindrical filter element 32 is oriented so that the long axis 75 is vertical and the short axis 76 is horizontal. As a result of this orientation, the distance 77 between the sidewall panel 17, 17' and the non-cylindrical filter elements 32 is increased over that the distance 87 between the sidewall panel 17, 17' and a conventional cylindrical filter element 83 (FIG. 9).

Referring again to FIG. 8, in a preferred embodiment, when the overall width of back element 30 is about 101.6 cm (40 inches) and each filter element 32 has an exterior short axis dimension 76 of about 30.08 cm (11.844 inches), the distance 77 from the side wall panel 17 to the outer edge of proximate end cap 82 is about 10 cm (4 inches), specifically 10.4 cm (4.08 inches). Such a positioning provides a distance between the two elements 32 of about 20.3 cm (8 inches), specifically 20.7 cm (8.16 inches). This embodiment provides that about 60% of the width of the back element 30 is occupied by the maximum width of the filter elements 32. In another preferred embodiment, when the overall width of back element 30 is about 101.6 cm (40 inches) and each filter element 32 has an exterior short axis dimension 76 of about 28.85 cm (11.36 inches), the distance 77 from the side wall panel 17 to the outer edge of proximate end cap 82 is about 11 cm (4 inches), specifically 11.0 cm (4.33 inches). Such a positioning provides a distance between the two elements 32 of about 22 cm (8.7 inches), specifically 22.0 cm (8.66 inches). This embodiment provides that about 57% of the width of the back element 30 is occupied by the maximum width of the filter elements 32.

Figure 9:
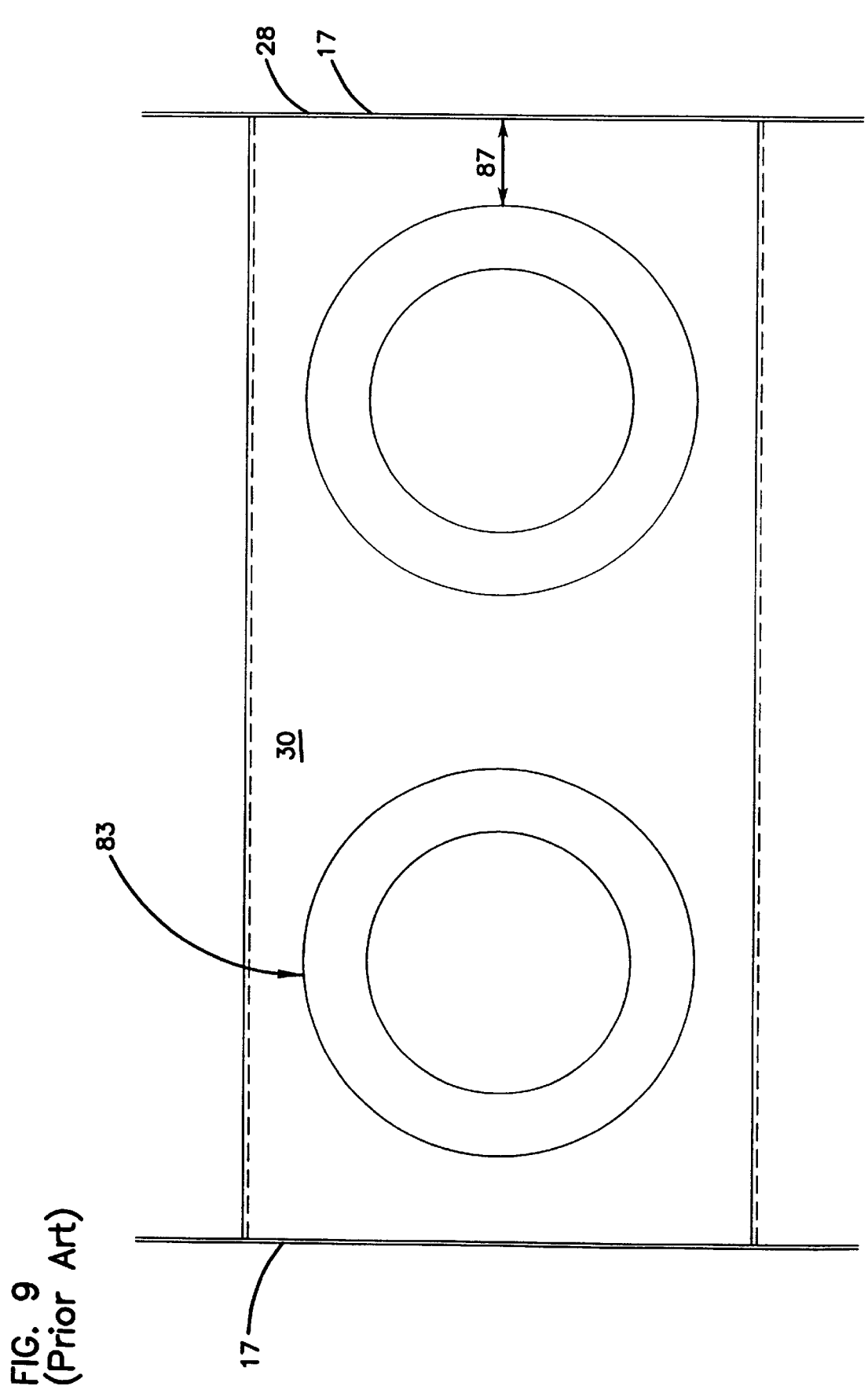
FIG. 9 is an end view of a row of conventional cylindrical filter elements mounted in a conventional air filtration system.

Referring to FIG. 9, conventional cylindrical filter elements 83 positioned on back element 30 having a width of about 101.6 cm (40 inches) are shown. Cylindrical filter elements 83 have the same amount of filtration media 35 as filter elements 32, but each filter element 83 has a diameter of about 35.2 cm (13.84 inches). In some embodiments, the amount of filtration media 35 in cylindrical filter elements 83 is more than in filter elements 32. Referring again to FIG. 9, the distance 87 from the side wall panel 17 to the outer edge of cylindrical filter element 83 is about 7.6 cm (3 inches), specifically 7.8 cm (3.08 inches). Such a positioning provides a distance between the two elements 83 of about 15.2 cm (6 inches), specifically 15.7 cm (6.16 inches). This embodiment provides that about 70% of the width of the back element 30 is occupied by the maximum width of the filter elements 32 and that only about 30% of the width is available for dirty air to flow through.

This difference between 30% and 40% area available for air flow is significant when taken over the length of the filter elements 32; the different between 30% and 43% is even more significant. An increase from 30% area available to 40% area available is an increase in available area of about 33%; and an increase from about 30% area available to 43% area available is an increase in available area of about 43%.

The air filter assembly of the present disclosure is designed to filter particulate from an incoming dirty air stream at a rate greater than conventional air filter assemblies that utilize cylindrical filter elements or constructions. One embodiment of the present disclosure provides a method of filtering dirty air to provide clean air. In particular, dirty incoming air, having a particulate contaminant concentration of at least 1 grain per cubic foot of air, is passed through an air filter assembly, preferably having non-cylindrical filter elements. The volume of incoming dirty air is at least 550 cubic feet per minute (cfm), preferably at least 600 cfm, and most preferably at least 625 cfm. The clean air exiting the air filter assembly has a contaminant concentration less than 0.001 grain particulate per cubic foot of air.

Experimental

The enhanced performance of the non-cylindrical configuration according to the present disclosure is illustrated by comparisons made with a conventional cylindrical filter element 83 in an air filter assembly, such as illustrated in FIG. 9. The cylindrical filter element shown at 83 may be one constructed in accordance with that described in U.S. Pat. No. 4,171,963 (Schuler).

Computer modeling was done by using Computational Fluid Dynamics (CFD) software commercially available from Fluent, Inc. (of Lebanon, N.H. , which is a program commonly used for analyzing laminar and turbulent fluid flow problems. A Hewlett-Packard V-Class computer with 16 microprocessors was used to run the modeling.

CFD predicts flow through a volume (i.e., a domain) by using two equations: the continuity equation, $\rho_1 A_1 v_1 = \rho_2 A_2 v_2 = $ constant, where p is the fluid density, A is the cross-sectional area, and v is the fluid velocity; and the momentum conservation equation, $\delta/\delta t\, (\rho u_i) + \delta/\delta x_j\, (\rho u_i u_j) = -\delta p/\delta x_i + \delta \tau_{ij}/\delta x_j + \rho g_i + F_i$, where $\rho$ is the static pressure, u is the axial velocity, $d\tau_{ij}$ is the stress tensor (function of molecular velocity), $\rho g_i$ is the gravitational body force, and $F_i$ is the external body force. CFD also uses the standard k-$\epsilon$ model to predict flow through the domain. The standard k-$\epsilon$ model is a semi-empirical model based on model transport equations for the turbulent energy (k) and its dissipation rate ($\epsilon$). The model transport equation for k is derived from the exact equation, while the model transport equation for $\epsilon$ is obtained using physical reasoning. In the derivation of the k-$\epsilon$ model for the present system, it was assumed that the flow is fully turbulent, and the effects of molecular viscosity are negligible. Based on the above equations, velocity, pressure and turbulence at any point of domain, flow path, can be predicted.

The two models (i.e., an air filter assembly having non-circular filter elements and an air filter assembly having conventional circular filter elements), were created using GAMBIT software package from Fluent, Inc. which is designed for building and meshing models for CFD. Each model utilized 16 filter elements to form eight rows of filter element pairs.

The model with 16 cylindrical filter elements used 1,514,104 Tet/Hybrid cells and the model with 16 non-cylindrical filters used 1,457,024 Tet/Hybrid cells. Both models were programmed with a Standard ABR (abrasion resistant) inlet with 18 inch diameter inlet duct and 37 inches by 20 inches rectangular outlet. After exporting models from GAMBIT to Fluent, the configuration in CFD was set as follows:

| Parameter | Cylindrical Filter Elements | Non-Cylindrical Filter Elements |
|---|---|---|
| Turbulence Model | k-epsilon (2 eqn) | k-epsilon (2 eqn) |
| Materials | Air | Air |
| Inlet Velocity | 21.03 m/s | 26.3 m/s |
| Outlet | Pressure Outlet | Pressure Outlet |
| Filter | Porous-Zone | Porous-Zone |
| Filter's Viscous Resistance | 8.445e + 08 1/m$^2$ | 8.945e + 08 1/m$^2$ |
| Discretization | Pressure-Standard Momentum-2nd Order Upwind Pressure Vel. Coupling-SIMPLE Turb. Kinetic Energy 1st Order Upwind Turb. Dissipat. Rate - 1st Order Upwind | Pressure-Standard Momentum-2nd Order Upwind Pressure Vel. Coupling-SIMPLE Turb. Kinetic Energy- 1st Order Upwind Turb. Dissipat. Rate - 1st Order Upwind |
| Residual Monitors | Continuity = 0.0001 x-velocity = 0.001 y-velocity = 0.001 z-velocity = 0.001 k = 0.001 $\epsilon$ = 0.001 | Continuity = 0.0001 x-velocity = 0.001 y-velocity = 0.001 z-velocity = 0.001 k = 0.001 $\epsilon$ = 0.001 |

The results of the CFD modeling showed that similar velocity fields exist within the dirty air chamber for the air filter assembly with conventional cylindrical filter elements with a total system air flow of 7315 cubic feet per minute cfin) and for the air filter assembly with non-cylindrical filter elements with a total system airflow of 9145 cfm. The volume of air passing through the model with the non-cylindrical filter elements was 25% more than the model employing conventional cylindrical filter elements.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size and arrangement of parts within the principles of the disclosure to the full extent indicated by the broad general meaning of the terms in which the appended claims are expressed.

We claim:

1. An air filter element comprising:
   (a) an extension of filter media having first and second opposite ends;
      (i) said filter media being pleated;
      (ii) said filter media being tubular and non-cylindrical and defining an open filter interior;
   (b) a first end cap; said filter media being potted within said first end cap at said first end;

(i) said first end cap defining an annular ring providing access to said open filter interior;
(c) a second end cap; said filter media being potted within said second end cap at said second end;
  (i) the filter element having a length from an outermost portion of said first end cap to an outermost portion of said second end cap of at least 18 inches;
(d) an inner liner extending between said first and second end caps;
  (i) said filter media circumscribing said inner liner;
(e) an outer liner extending between said first and second end caps;
  (i) said outer liner circumscribing said filter media;
(f) a sealing gasket extending axially from said first end cap; and
(g) the filter media, first end cap and second end cap each defining a long axis and a short axis relative to a perpendicular direction of the filter media;
  (i) a ratio of the short axis to the long axis being 0.7–0.9.

2. A filter element according to claim 1 wherein:
(a) the ratio of the short axis to the long axis is about 0.8.

3. A filter element according to claim 1 wherein:
(a) said filter media comprises pleated paper.

4. A filter element according to claim 1 wherein:
(a) said first end cap has:
  (i) an exterior dimension along said long axis of 13–15 inches;
  (ii) an interior dimension along said long axis of 10–12 inches;
  (iii) an exterior dimension along said short axis of 10–12 inches; and
  (iv) an interior dimension along said short axis of 7–9 inches.

5. A filter element according to claim 4 wherein
(a) said filter element defines a length of no greater than 48 inches.

6. A filter element according to claim 4 wherein:
(a) said filter element defines a length of 22–30 inches.

7. A filter element according to claim 6 wherein:
(a) said second end cap is a continuous, closed end cap.

8. A filter element according to claim 6 wherein:
(a) said second end cap defines an annular ring providing access to said open filter interior.

9. An air filter element comprising:
(a) an extension of filter media having first and second opposite ends;
  (i) said filter media being pleated paper;
  (ii) said filter media being tubular and non-cylindrical and defining an open filter interior;
(b) a first end cap; said filter media being potted within said first end cap at said first end;
  (i) said first end cap defining an annular ring providing access to said open filter interior;
(c) a second end cap; said filter media being potted within said second end cap at said second end;
  (i) the filter element having a length from an outermost portion of said first end cap to an outermost portion of said second end cap of about 26 inches;
(d) an inner liner extending between said first and second end caps;
  (i) said filter media circumscribing said inner liner;
(e) an outer liner extending between said first and second end caps;
  (i) said outer liner circumscribing said filter media;
(f) a sealing gasket extending axially from said first end cap; and
(g) the filter media, first end cap and second end cap each defining a long axis and a short axis relative to a perpendicular direction of the filter media;
  (i) a ratio of the short axis to the long axis being about 0.8;
  (ii) said first end cap having:
    (A) an exterior dimension along said long axis of 13–15 inches;
    (B) an interior dimension along said long axis of 10–12 inches;
    (C) an exterior dimension along said short axis of 10–12 inches; and
    (D) an interior dimension along said short axis of 7–9 inches.

10. A filter element according to claim 9 wherein:
(a) said second end cap is a continuous, closed end cap.

11. A filter element according to claim 9 wherein:
(a) said second end cap defines an annular ring providing access to said open filter interior.

12. A method of mounting a filter element in an air filtration system; the system including a housing including an air inlet, an air outlet, a spacer wall separating the housing into a filtering chamber and a clean air chamber; the air inlet providing a dirty air volume to the air filtration system; the spacer wall including a first air flow aperture therein; the method comprising:
(a) mounting a first filter element in the filtering chamber and in air flow communication with the first air flow aperture in the spacer wall; the first filter element including:
  (i) an extension of filter media having first and second opposite ends; the filter media being pleated; the filter media being tubular and non-cylindrical and defining an open filter interior;
  (ii) a first end cap; the filter media being potted within the first end cap at the first end; the first end cap defining an annular ring providing access to the open filter interior;
  (iii) a second end cap; the filter media being potted within the second end cap at the second end;
  (iv) an inner liner extending between the first and second end caps; the filter media circumscribing the inner liner;
  (v) an outer liner extending between the first and second end caps; the outer liner circumscribing the filter media;
  (vi) a gasket extending axially from the first end cap;
  (vii) the filter media, first end cap and second end cap each defining a long axis and a short axis relative to a perpendicular direction of the filter media; a ratio of the short axis to the long axis being 0.7–0.9; and
(b) forming a seal by axially compressing the gasket against the spacer wall.

13. A method according to claim 12 wherein:
(a) said step of mounting a filter element includes mounting a filter element having a first end cap with:
  (i) an exterior dimension along the long axis of 13–15 inches;
  (ii) an interior dimension along the long axis of 10–12 inches;
  (iii) an exterior dimension along the short axis of 10–12 inches; and
  (iv) an interior dimension along the short axis of 7–9 inches.

14. A method according to claim 13 further including:
(a) mounting a second filter element against the first filter element and in air flow communication therewith; the second filter element being tubular and non-cylindrical.

15. A method according to claim 14 wherein:
(a) said step of mounting a first filter element includes mounting a first filter element having an open, annular second end cap; and
(b) said step of mounting a second filter element includes mounting a second filter element having first open annular end cap and a second closed end cap.

16. An air filter element comprising:
(a) an extension of filter media having first and second opposite ends;
    (i) said filter media being pleated;
    (ii) said filter media being non-cylindrical and defining an open filter interior;
(b) a first end cap; said filter media being potted within said first end cap at said first end;
    (i) said first end cap defining an annular ring providing access to said open filter interior;
(c) a second end cap; said filter media being potted within said second end cap at said second end;
(d) an inner liner extending between said first and second end caps;
    (i) said filter media circumscribing said inner liner;
(e) a sealing gasket extending axially from said first end cap; and
(f) the filter media, first end cap and second end cap each defining a long axis and a short axis relative to a perpendicular direction of the filter media;
    (i) a ratio of the short axis to the long axis being 0.7–0.9.

17. A filter element according to claim 16 wherein:
(a) the ratio of the short axis to the long axis is about 0.8.

18. A filter element according to claim 17 wherein:
(a) said filter media comprises pleated paper.

19. A filter element according to claim 18 wherein:
(a) the filter element has a length from an outermost portion of said first end cap to an outermost portion of said second end cap of at least 18 inches.

20. A filter element according to claim 18 further including:
(a) an outer liner extending between said first and second end caps;
    (i) said outer liner circumscribing said filter media.

21. A filter element according to claim 16 wherein:
(a) said first end cap has:
    (i) an interior dimension along said long axis of 13–15 inches;
    (ii) an exterior dimension along said short axis of 10–12 inches;an
    (iii) an interior dimension along said short axis of 10–12 inches; and
    (iv) an interior dimension along said short axis of 7–9 inches.

* * * * *

UNITED STATES PATENT AND TRADEMARK OFFICE
CERTIFICATE OF CORRECTION

PATENT NO. : 6,488,746 B1
DATED : December 3, 2002
INVENTOR(S) : Kosmider et al.

It is certified that error appears in the above-identified patent and that said Letters Patent is hereby corrected as shown below:

<u>Title page,</u>
Item [73], Assignee, delete "Merchant & Gould" and insert
-- Donaldson Company, Inc. --.

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,488,746 B1
DATED : December 3, 2002
INVENTOR(S) : Kosmider et al.

It is certified that error appears in the above-identified patent and that said Letters Patent is hereby corrected as shown below:

Column 8,
Line 30, delete "(cfin)" and insert -- (cfm) --;

Column 11,
Line 50, after "where", delete "p" and insert -- $\rho$ --;

Column 12,
Line 44, delete "(cfin)" and insert -- (cfm) --;

Column 16,
Line 21, delete "interior" and insert -- exterior -- and delete "152" and insert -- 15 --;
Line 23, delete "exterior" and insert -- interior -- and delete "short" and insert -- long --;
Line 24, after ";" delete "an";
Line 25, delete "interior" and insert -- exterior --.

Signed and Sealed this

Fifth Day of October, 2004

JON W. DUDAS
*Director of the United States Patent and Trademark Office*